(12) United States Patent  
Hammer

(10) Patent No.: US 7,913,910 B2
(45) Date of Patent: Mar. 29, 2011

(54) METHOD OF PROGRAMMING A BARCODE SCANNER

(75) Inventor: Steven J. Hammer, Lilburn, GA (US)

(73) Assignee: NCR Corporation, Duluth, GA (US)

( * ) Notice: Subject to any disclaimer, the term of this patent is extended or adjusted under 35 U.S.C. 154(b) by 1006 days.

(21) Appl. No.: 11/693,247

(22) Filed: Mar. 29, 2007

(65) Prior Publication Data

US 2008/0237331 A1   Oct. 2, 2008

(51) Int. Cl.
G06F 17/00 (2006.01)
G06F 19/00 (2011.01)
G06K 7/10 (2006.01)

(52) U.S. Cl. ......... 235/462.15; 235/462.01; 235/462.14; 235/462.25; 235/462.45; 235/462.49; 235/472.01; 235/472.02; 235/472.03

(58) Field of Classification Search ............. 235/462.01, 235/462.14, 462.15, 462.25, 462.45, 462.49, 235/472.01–472.03
See application file for complete search history.

(56) References Cited

U.S. PATENT DOCUMENTS

| | | | | |
|---|---|---|---|---|
| 5,900,613 A | * | 5/1999 | Koziol et al. | 235/462.15 |
| 5,965,863 A | * | 10/1999 | Parker et al. | 235/462.25 |
| 6,698,656 B2 | * | 3/2004 | Parker et al. | 235/462.01 |
| 6,902,114 B2 | * | 6/2005 | Hashimoto et al. | 235/462.25 |
| 7,367,514 B2 | * | 5/2008 | Soule et al. | 235/494 |
| 2004/0262392 A1 | * | 12/2004 | Longacre et al. | 235/462.07 |
| 2005/0011958 A1 | * | 1/2005 | Fukasawa et al. | 235/462.46 |

* cited by examiner

Primary Examiner — Thien M. Le
Assistant Examiner — Tuyen K Vo
(74) Attorney, Agent, or Firm — Paul W. Martin

(57) ABSTRACT

A method of programming a barcode label with a single programming barcode label. The method includes printing a single programming barcode label for implementing a plurality of program features by a computer, and scanning the single programming barcode label.

7 Claims, 5 Drawing Sheets

METHOD OF PROGRAMMING A BARCODE SCANNER

BACKGROUND

One method of programming a barcode scanner is to open a book provided by the manufacturer of the scanner to find barcode labels associated with program features of the scanner. A programmer chooses barcode labels within the book corresponding to desired program features, then flips the pages, scanning one barcode label at a time. This method is tedious and may be prone to error since chosen barcode labels must be scanned in an order prescribed by the manufacturer.

It would be desirable to provide a method of programming a barcode scanner that is less tedious.

SUMMARY

A method of programming a barcode scanner is provided.

An example method includes printing a single programming barcode label for implementing a plurality of program features by a computer, and scanning the single programming barcode label.

DETAILED DESCRIPTION

Figure 1:
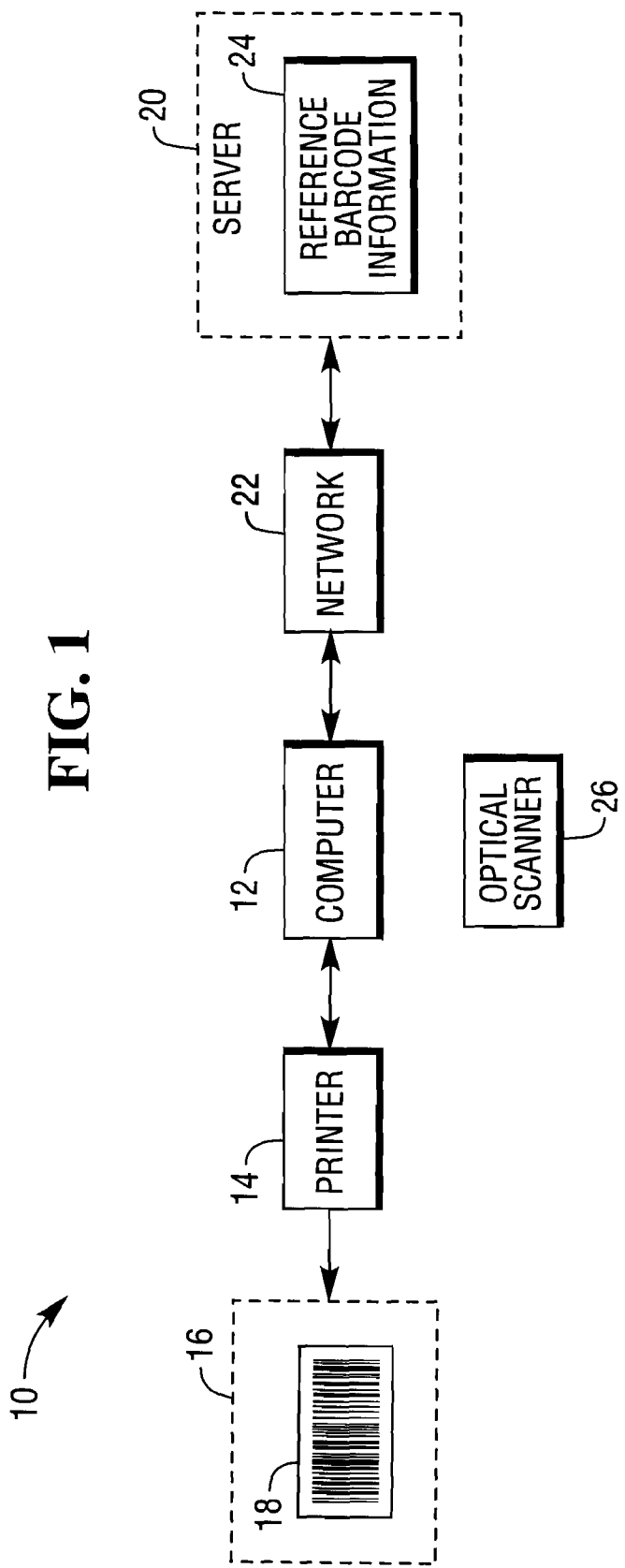
FIG. 1 is a block diagram of a system for generating a programming barcode label.
Figure 2:
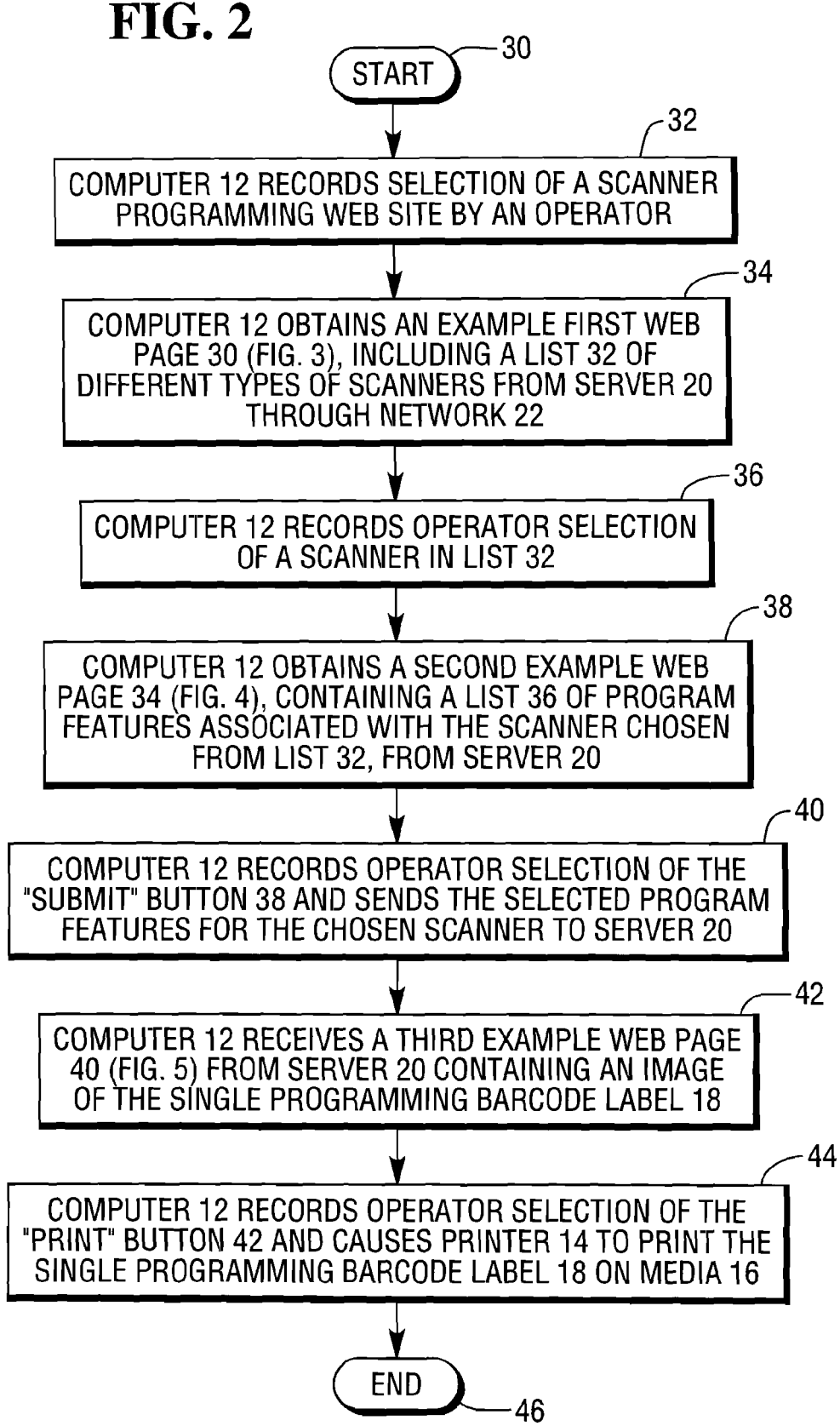
FIG. 2 is a flowchart illustrating the method of the present invention.
Figure 3:
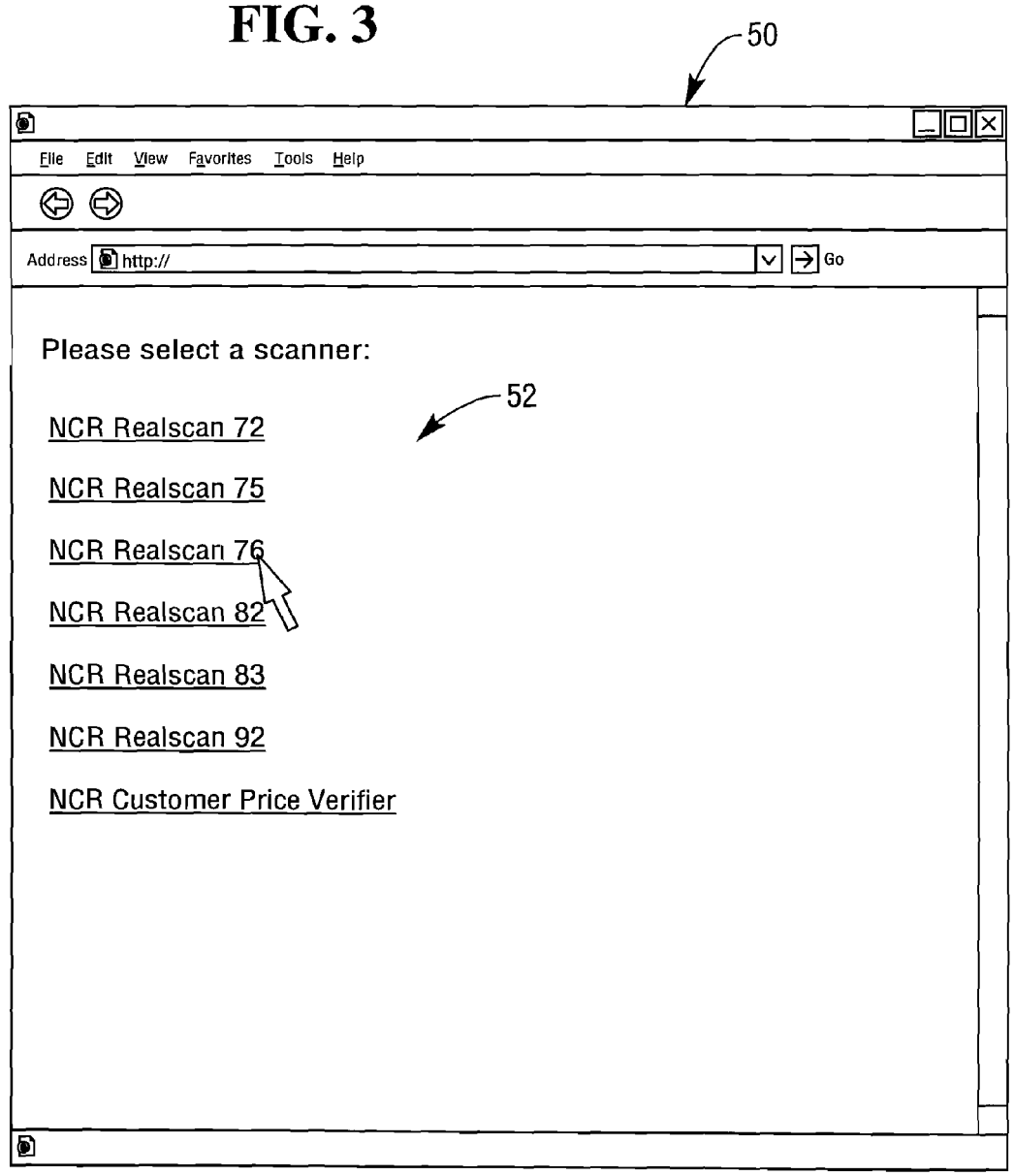
FIG. 3 illustrates an example web page for selecting a type of scanner.
Figure 4:
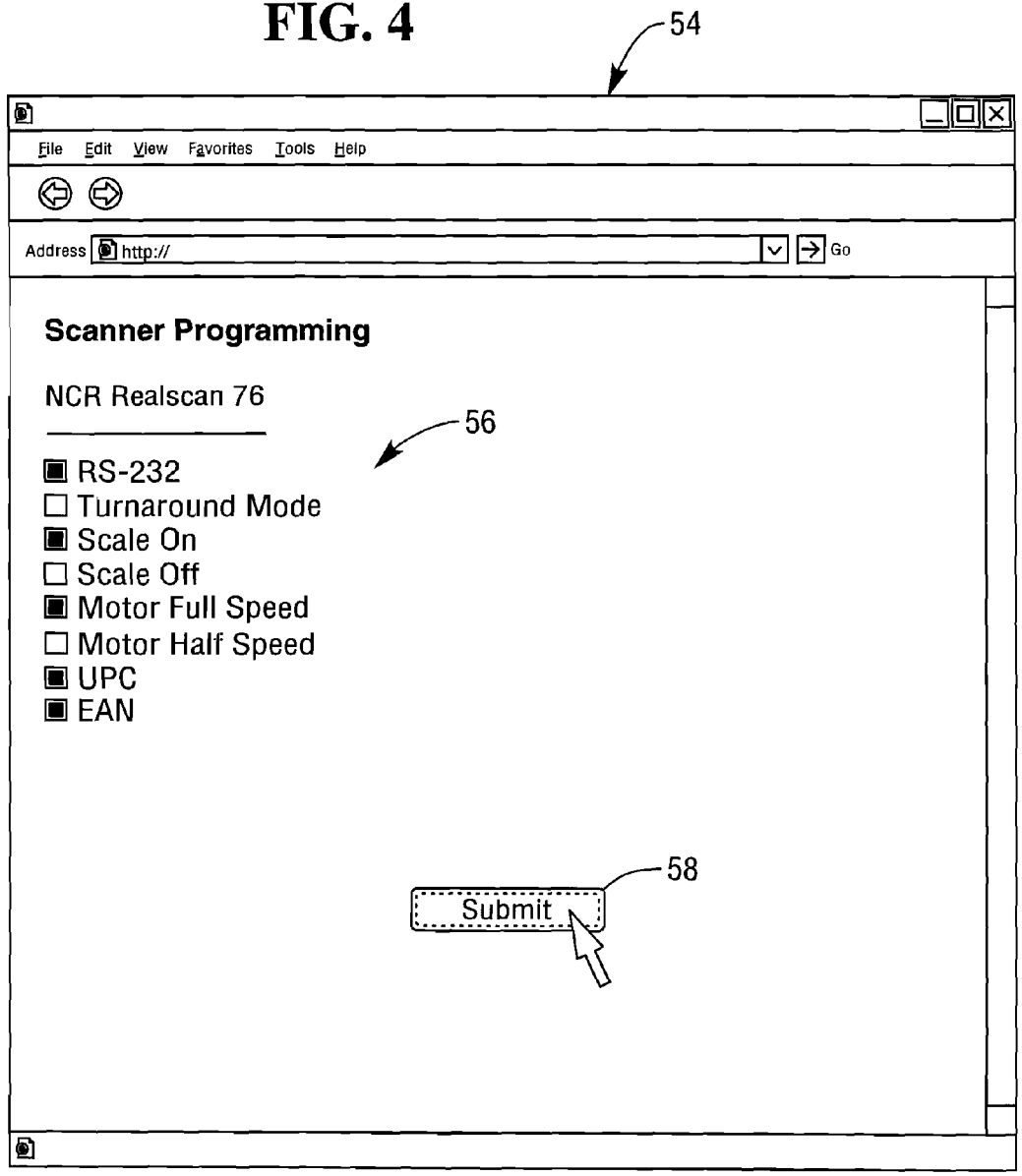
FIG. 4 illustrates an example web page for selecting program options for a selected scanner.
Figure 5:
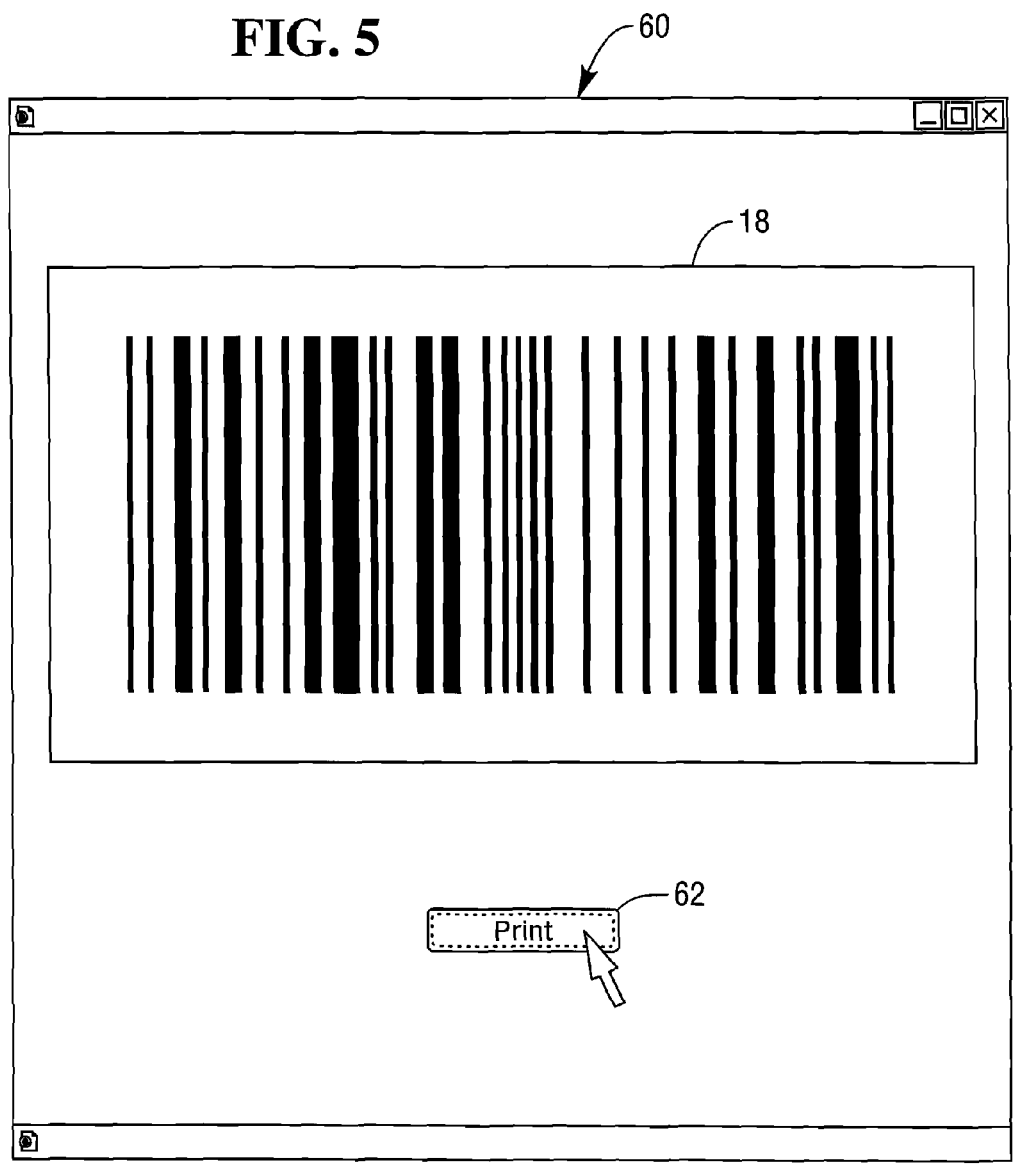
FIG. 5 illustrates an example web page for selecting printing of a programming barcode label.

With reference to FIG. 1, system 10 primarily includes computer 12 and printer 14.

Computer 12 is used by an operator to obtain and cause printer 14 to print a single barcode label 18 for programming optical scanner 26.

Single programming barcode label 18 may be constructed using a single standard barcode label symbology that scanner 26 is capable of reading. One such symbology may include the C128 symbology.

Computer 12 may be a stand-alone computer containing reference barcode information 24, or computer 12 may connect to server 20, which stores reference barcode information 24. In the illustrated example, computer 12 interacts with server 20 to obtain a single programming barcode label 18 for programming optical scanner 26.

Computer 12 includes typical components of a personal computer, including a processor, memory, permanent storage, display, and one or more input devices, such as a keyboard and mouse, software, including an operating system, drivers, and a web browser, and is capable of communicating with printer 14 and with server 20 over network 22.

Computer 12 displays web pages from server 20 for guiding an operator through a process of creating and printing a single programming barcode label 18 for optical scanner 26.

Printer 14 prints single programming barcode label 18 on media 16. Printer 14 may include an inkjet, laser, thermal, or any other type printer and associated media capable of producing dark to light transitions on media 16 that satisfy established printing standards for barcode labels.

Server 22 may include a web server, having typical components of a web server, including a processor, memory, permanent storage, display, and one or more input devices, such as a keyboard and mouse, software, including an operating system, drivers, and web site software and web pages, and is capable of communicating with computer 12 over network 22.

Server 22 receives requests for programming barcode labels 18 from computer 12 and sends the programming barcode labels 18 to computer 12.

Network 22 may include a global network, commonly known as the Internet, or a private network, such as an in-store network.

Scanner 26 includes typical components of an optical scanner, including a processor, memory, firmware or software, a laser, mirrors, and a photodetector, and is capable of communicating with computer 12.

The software or firmware of optical scanner 26 is capable of identifying single programming barcode label 18 as a programming barcode label. For example, single programming barcode label 18 may include a few characters at the beginning that identify it as a programming barcode label.

The software or firmware is also able to decode single programming barcode label 18 and implementing instructions contained therein. If single programming barcode label 18 is based upon a standard barcode symbology, scanner 26 requires no special software or firmware.

With reference to FIGS. 2-5, an example method of programming a barcode scanner is illustrated beginning with START 30. Though the method illustrates three web pages for completing the method, variations in the content of these web pages, as well as in the number of web pages, is envisioned by the invention.

In step 32, computer 12 records selection of a scanner programming web site by an operator. For example, the operator may type in the address or uniform resource locator (URL) of the scanner programming web site in the web browser software, or activate a shortcut or link containing the address.

In step 34, computer 12 obtains an example first web page 50 (FIG. 3), including a list 52 of different types of scanners from server 20 through network 22. List 52 contains hyperlinks to subsequent web pages of server 20. Web page 50 may include additional information to explain the process of creating a programming barcode label 18 or to otherwise assist the operator.

In step 36, computer 12 records operator selection of a scanner in list 52. An operator wishing to program one of the scanners on list 52 selects the one scanner in list 52.

In step 38, computer 12 obtains a second example web page 54 (FIG. 4), containing a list 56 of program features associated with the scanner chosen from list 52, from server 20. The operator wishing to program the chosen scanner selects program features in list 56, for example, by selecting a selection box adjacent each feature, and then selects the "submit" button 58 in web page 54.

In step 40, computer 12 records operator selection of the "submit button 58 and sends the selected program features for the chosen scanner to server 20.

Server 20 receives the selected program features from computer 12 and compares the program features to reference barcode information 24 to determine a single programming barcode label 18. Reference barcode information 24 includes single programming barcode labels 18 corresponding to each possible combination of program features.

In step 42, computer 12 receives a third example web page 60 (FIG. 5) from server 20 containing an image of the single programming barcode label 18. The operator wishing to print the single programming barcode label selects the "print" button 62 in web page 60.

In step 44, computer 12 records operator selection of the "print" button 62 and causes printer 14 to print the single programming barcode label 18 on media 16.

Operation ends at step 46.

Scanner 26 scans only single programming barcode label 18. The firmware or software in scanner 26 identifies single programming barcode label 18 and decomposes single programming barcode label 18 into individual programming options selected via the web page of FIG. 4.

Advantageously, the operator need not pass multiple programming barcode labels over scanner 26, also avoiding the trouble of arranging the multiple programming barcode labels in a proper sequence.

Although particular reference has been made to certain embodiments, variations and modifications are also envisioned within the spirit and scope of the following claims.

What is claimed is:

1. A method of programming a barcode reader comprising:
displaying a list of barcode readers and program features associated with the barcode readers by a computer;
recording operator selection of one of the barcode readers from the list and a plurality of the program features associated with the one barcode reader by the computer;
obtaining a single programming barcode label for implementing the plurality of the program features in the one barcode reader by the computer from a server; and
causing a printer to print the single programming barcode label by the computer.

2. The method of claim 1, further comprising:
scanning the single programming barcode label by the one barcode reader to program the one barcode reader with the plurality of the program features.

3. A method of programming a barcode reader comprising:
recording an operator selection of a web site by a computer;
obtaining a number of web pages containing a list of barcode readers and program features associated with the barcode readers by the computer;
recording another operator selection of one of the barcode readers from the list and a plurality of the program features associated with the one barcode reader by the computer;
obtaining a single programming barcode label for implementing the plurality of the program features in the one barcode reader from the web site by the computer; and
causing a printer to print the single programming barcode label by the computer.

4. The method of claim 3, further comprising
scanning the single programming barcode label by the one barcode reader to program the one barcode reader with the plurality of the program features.

5. The method of claim 3, further comprising:
displaying the single programming barcode label by the computer.

6. A system for programming a barcode reader comprising:
a computer for displaying a list of barcode readers and program features associated with the barcode readers, for recording operator selection of one of the barcode readers from the list and a plurality of the program features associated with the one barcode reader, for obtaining a single programming barcode label for implementing the plurality of the program features in the one barcode reader from a server, and for causing a printer to print the single programming barcode label.

7. A system for programming a barcode reader comprising:
a computer for recording selection of a web site, for obtaining a number of web pages containing a list of barcode readers and program features associated with the barcode readers, for recording operator selection of one of the barcode readers from the list and a plurality of the program features associated with the one barcode reader, for obtaining a single programming barcode label for implementing the plurality of the program features in the one barcode reader from the web site, and for causing a printer to print the single programming barcode label.

* * * * *